(12) United States Patent
Cacioppo et al.

(10) Patent No.: US 8,771,884 B1
(45) Date of Patent: Jul. 8, 2014

(54) REACTANT CONDITIONING SCHEME FOR FUEL CELL SYSTEMS

(71) Applicant: Plug Power Inc., Latham, NY (US)

(72) Inventors: Michael Cacioppo, Saratoga Springs, NY (US); Ranjieve A. Williams, Guilderland, NY (US); Charles R. Elder, Averill Park, NY (US)

(73) Assignee: Plug Power, Inc., Latham, NY (US)

( * ) Notice: Subject to any disclaimer, the term of this patent is extended or adjusted under 35 U.S.C. 154(b) by 21 days.

(21) Appl. No.: 13/724,146

(22) Filed: Dec. 21, 2012

Related U.S. Application Data

(60) Provisional application No. 61/578,740, filed on Dec. 21, 2011.

(51) Int. Cl.
*H01M 8/06* (2006.01)
*H01M 8/04* (2006.01)

(52) U.S. Cl.
CPC ...... *H01M 8/04119* (2013.01); *H01M 8/04126* (2013.01)
USPC .......................................... 429/413; 429/414

(58) Field of Classification Search
CPC .............. Y02E 60/50; H01M 8/04007; H01M 8/04089; H01M 8/04119; H01M 8/04126; H01M 8/04156
USPC .................................................... 429/413, 414
See application file for complete search history.

(56) References Cited

U.S. PATENT DOCUMENTS

| | | | | |
|---|---|---|---|---|
| 6,967,064 | B2 * | 11/2005 | Haltiner et al. | 429/425 |
| 7,722,996 | B2 * | 5/2010 | Kobayashi et al. | 429/413 |
| 7,858,256 | B2 * | 12/2010 | Bandhauer et al. | 429/440 |
| 2009/0047552 | A1 * | 2/2009 | Butt et al. | 429/13 |

* cited by examiner

*Primary Examiner* — Stewart Fraser
(74) *Attorney, Agent, or Firm* — Heslin Rothenberg Farley & Mesiti P.C.; Victor A. Cardona

(57) ABSTRACT

A fuel cell system includes a fuel cell stack and a reactant temperature conditioner. The conditioner includes a fuel inlet for receiving fuel from a fuel source and an oxidant inlet for receiving oxidant from an oxidant source. The conditioner is configured to transfer heat energy from the oxidant to the fuel to arrive at a conditioned oxidant and a conditioned fuel. The conditioner has a fuel outlet coupled to the fuel cell stack to allow flow of the conditioned fuel to the fuel cell stack and an oxidant outlet to allow flow of the conditioned oxidant to the fuel cell stack.

22 Claims, 5 Drawing Sheets

REACTANT CONDITIONING SCHEME FOR FUEL CELL SYSTEMS

CROSS-REFERENCE TO RELATED APPLICATIONS

This application claims priority to U.S. Provisional Application No. 61/578,740 filed on Dec. 21, 2011, entitled "Reactant Conditioning Scheme for Fuel Cell Systems", the entire disclosure of which is incorporated herein by reference.

This application is also related to U.S. patent application Ser. No. 13/724,181, filed on Dec. 21, 2012, entitled "Systems and Methods for Stack Exhaust Air Recirculation to Allow Fuel Cell System Operation in a Freezing Environment", which claims priority to U.S. Provisional Application No. 61/578,560 filed on Dec. 21, 2011, the entire disclosures of which are incorporated herein by reference

TECHNICAL FIELD

This invention relates generally to fuel cells and fuel cell systems, and more particularly to methods to thermally condition fuel cell reactants prior to their being delivered to fuel cells.

BACKGROUND OF THE INVENTION

Fuel cells electrochemically convert fuels and oxidants to electricity and heat and can be categorized according to the type of electrolyte (e.g., solid oxide, molten carbonate, alkaline, phosphoric acid or solid polymer) used to accommodate ion transfer during operation. Moreover, fuel cell assemblies can be employed in many (e.g., automotive, aerospace, industrial, residential) environments for multiple applications.

A Proton Exchange Membrane (hereinafter "PEM") fuel cell converts the chemical energy of fuels such as hydrogen and oxidants, such as air, directly into electrical energy. The PEM is a solid polymer electrolyte that permits the passage of protons (i.e., H+ ions) from the "anode" side of the fuel cell to the "cathode" side of the fuel cell while preventing passage therethrough of reactant fluids (e.g., hydrogen and air gases). The membrane electrode assembly is placed between two electrically conductive plates, each of which has a flow passage to direct the fuel to the anode side and oxidant to the cathode side of the PEM.

Two or more fuel cells can be connected together to increase the overall power output of the assembly. Generally, the cells are connected in series, wherein one side of a plate serves as an anode plate for one cell and the other side of the plate is the cathode plate for the adjacent cell. Such a series of connected multiple fuel cells is referred to as a fuel cell stack. The stack typically includes means for directing the fuel and the oxidant to the anode and cathode flow field channels, respectively. The stack also usually includes a means for directing a coolant fluid to interior channels within the stack to absorb heat generated by the exothermic reaction of hydrogen and oxygen within the fuel cells. The stack also generally includes means for exhausting the excess fuel and oxidant gases, as well as product water.

Many fuel cell systems include a balance of plant that supplies the necessary reactant and cooling fluids for a fuel cell or fuel cell stack. The balance of plant may include devices such as pumps, air compressors, blowers, fans, valves, and sensors. These devices function cohesively to provide power to a load, such as a stationary device or an industrial electric vehicle. In order for the fuel cell stack to achieve optimal efficiency and longevity, the reactants must be properly humidified. Compressing a fluid such as air will increase the temperature of the fluid as well as the pressure due to the isentropic and mechanical inefficiencies associated with the component. Depending on the design of the compressor and the compression ratio, this resultant temperature may be too high for downstream components, such as a humidifier.

Many fuel cell systems store fuel on board at or near room temperature. Humidification of the fuel may be accomplished by recycling saturated exhaust fuel and blending it with fuel from the fuel supply. If a warm saturated fuel were to be combined with a cool, dry fuel liquid water may be formed.

Thus, there is a need to properly condition the temperature of the reactants before they are directed to the fuel cell or fuel cell stack in order to optimize the operation of the fuel cell system.

SUMMARY OF THE INVENTION

The present invention provides a means to thermally condition the reactants of a fuel cell system by exchanging heat between certain fluid streams of a fuel cell system in a single, multi-stream component.

In one aspect of the present invention, a fuel cell system includes a fuel cell stack and a reactant temperature conditioner. The conditioner includes a fuel inlet for receiving fuel from a fuel source and an oxidant inlet for receiving oxidant from an oxidant source. The conditioner is configured to transfer heat energy from the oxidant to the fuel to arrive at a conditioned oxidant and a conditioned fuel. The conditioner has a fuel outlet coupled to the fuel cell stack to allow flow of the conditioned fuel to the fuel cell stack and an oxidant outlet to allow flow of the conditioned oxidant to the fuel cell stack.

In another aspect of the present invention, a fuel cell system includes a fuel cell stack and a reactant temperature conditioner coupled to a fuel source and an oxidant source. The conditioner has a fuel inlet for receiving fuel from the fuel source and an oxidant inlet for receiving oxidant from the oxidant source. The conditioner is configured transfer heat energy from the oxidant to the fuel to arrive at conditioned oxidant and conditioned fuel. The conditioner has a fuel outlet coupled to the fuel cell stack to allow flow of the conditioned fuel to the fuel cell stack and an oxidant outlet to allow flow of the conditioned oxidant to the fuel cell stack. A coolant source is coupled to the fuel cell stack which includes a coolant outlet coupled to the conditioner to allow flow of exhaust coolant from the fuel cell stack to the conditioner to allow a transfer of heat energy from the oxidant to the coolant.

In a further aspect of the present invention, a method for operating a fuel cell includes flowing a fuel from a fuel source and an oxidant from an oxidant source to a reactant temperature conditioner. Heat energy is transferred from the oxidant to the fuel in the conditioner to form a conditioned oxidant and a conditioned fuel. The conditioned oxidant and the conditioned fuel are flowed to a fuel cell stack.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DETAILED DESCRIPTION

Figure 1:
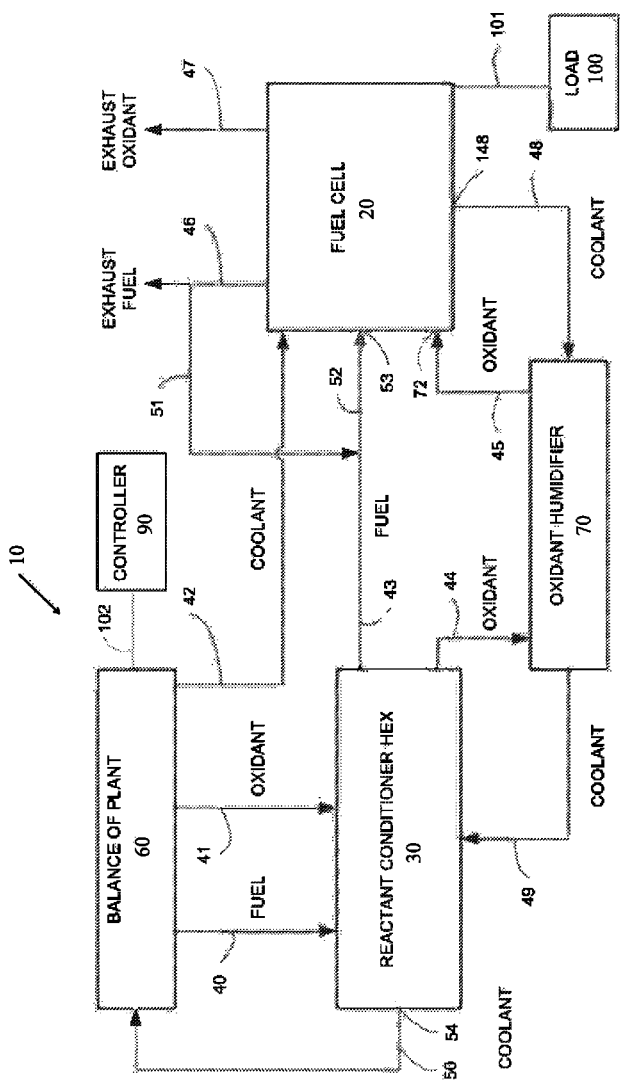
FIG. 1 is a block diagram of a fuel cell system in accordance with the present invention.

An example of a fuel cell system which incorporates the novel features of the present invention is depicted in FIG. 1 and described in detail herein. As depicted in FIG. 1, a fuel cell system 10 includes a fuel cell 20, a reactant conditioner heat exchanger 30, an oxidant humidifier 70, and a balance of plant 60. The balance of plant may include devices such as pumps, air compressors, blowers, fans, valves, and sensors.

Reactant conditioner heat exchanger 30 may be supplied with a fuel 40, for example, hydrogen, and an oxidant 41, for example, air, via balance of plant 60 including sources of oxidant and fuel. As depicted in FIG. 1, reactant conditioner heat exchanger 30 may be supplied with a coolant stream 49 from fuel cell 20 after the coolant has absorbed process heat from fuel cell 20 and exhaust coolant 49 has passed through oxidant humidifier 70. In an alternate embodiment, cooling fluid 49 may be supplied to heat exchanger 30 from balance of plant 60, before being directed to fuel cell stack 20.

Balance of plant 60 may include a compressor to supply system 10 with a pressurized oxidant (e.g., oxidant 41). The isentropic and mechanical inefficiencies of such a compressor often require heat to be removed from oxidant 41 before the oxidant is supplied to downstream components, such as the oxidant humidifier 70 or the fuel cell 20.

As depicted in FIG. 1, a recycled fuel portion 51 of an exhaust fuel 46 may be recycled and directed towards an intake side of the fuel cell 20. Recycled fuel 51 may be saturated with process water which has diffused across the membrane electrode assembly. This process water is used to humidify an incoming conditioned fuel stream 43 from conditioner 30 by mixing fuel stream 43 with recycled fuel 51 prior to a combined stream 52 being input to fuel cell 20. For example, a conduit conveying recycled fuel 51 may directly be connected to a conduit carrying fuel stream 43 to result in a mixing portion of a conduit after such connection or such mixing may be performed in another mixer. The temperature of fuel 40 may be colder than recycled fuel portion 51, and combining the two streams may result in the formation of liquid water, which is an undesired input to a fuel cell (e.g., fuel cell 20).

Reactant conditioner heat exchanger 30 both preheats fuel 40 as well as cools oxidant 41 by exchanging heat between the two fluids. Preheating of fuel 40 allows mixing of fuel stream 43 from heat exchanger 30 and recycled fuel 51 with minimal liquid water formation. Fuel cell 20 may be cooled by a supply of coolant 42 received from balance of plant 60 and exhaust coolant 48 may be output through a coolant outlet 148 and supplied to an inlet of oxidant humidifier 70 and coolant stream 49 may flow from humidifier 70 to conditioner heat exchanger 30. Excess heat from oxidant 41 (e.g., excess heat not utilized to warm fuel 40) may be rejected to coolant stream 49 in conditioner heat exchanger 30 such that conditioned coolant 50 leaves the conditioned coolant outlet 54 of conditioner heat exchanger 30 and is re-cooled to an appropriate temperature by a coolant element of balance of plant 60 prior to coolant 42 being utilized to regulate the temperature of fuel cell 20. In this manner, both reactant fluids (e.g., fuel 40 and an oxidant 41) are thermally conditioned for their respective downstream components by means of a single, multi-stream component (e.g., conditioner heat exchanger 30) prior to reacting in fuel cell 20. The conditioned fluids (i.e., conditioned oxidant 44 and conditioned fuel 43) may then be conveyed toward a fuel inlet 53 of fuel cell 20 and oxidant humidifier 70 or an oxidant inlet 72 of fuel cell 20 for the conditioned fuel and conditioned oxidant respectively. The exchange of heat between the indicated fluids in conditioner heat exchanger 30 may be performed via any of various heat exchanging methods, such as coils of circulating fluid contacting each other to allow heat to be passed from one fluid to another.

Figure 2:
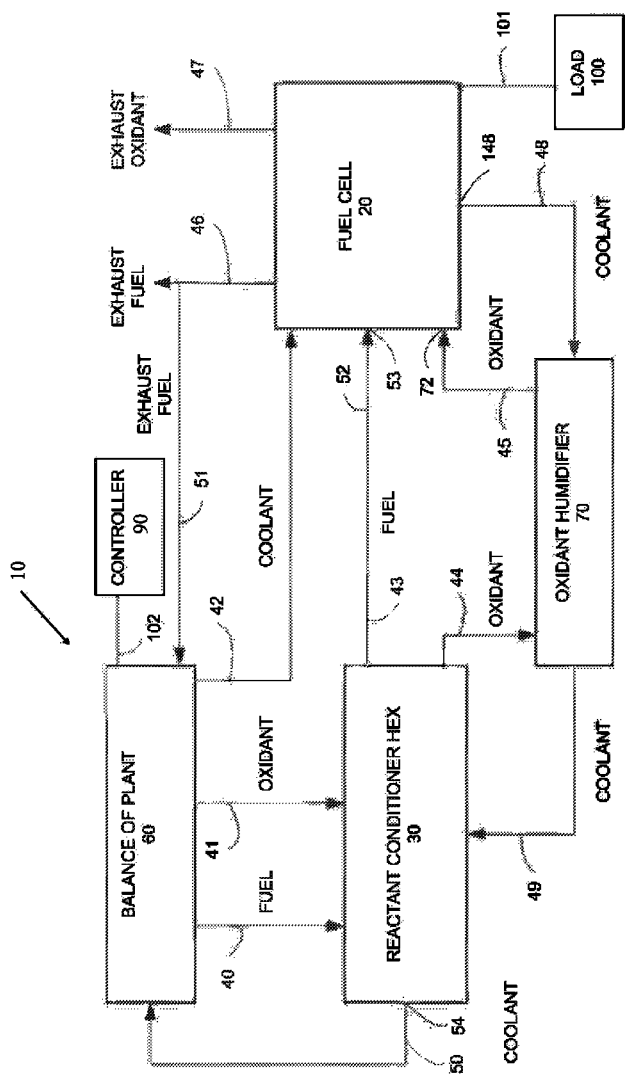
FIG. 2 is a block diagram of another example of a fuel cell system in accordance with the present invention.
Figure 3:
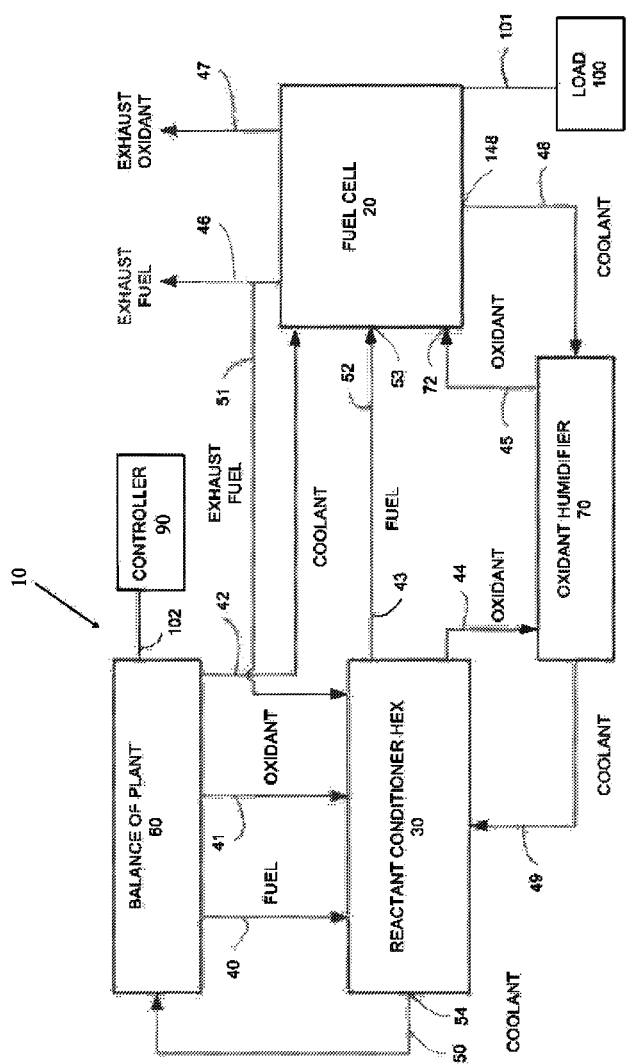
FIG. 3 is a block diagram of another example of a fuel cell system in accordance with the present invention.

In an alternate embodiment depicted in FIG. 2, recycled fuel 51 of exhaust fuel 46 may be mixed with fuel 40 upstream of reactant conditioner heat exchanger 30 in balance of plant 60. Alternatively, as depicted in FIG. 3, recycled fuel portion 51 of exhaust fuel 46 may be mixed with fuel 40 within reactant conditioner heat exchanger 30, but upstream of a portion of exchanger 30 which accomplishes the majority of the heat transfer. Mixing recycled fuel 51 with fuel 40 may result in the formation of liquid water. Reactant conditioner heat exchanger 30 may incorporate a liquid water drop out and removal system at an outlet side of heat exchanger 30, downstream of the portion of the heat exchanger which accomplishes the majority of the heat transfer. The water drop out and removal system may minimize the quantity of liquid water which is then sent to fuel cell stack 20. The remaining portions of FIGS. 2 and 3 not addressed above are identical to those in FIG. 1.

Fuel cell system 10 may provide electrical power to a load 100 having an electrical demand, such as a stationary device or an industrial electric vehicle. Fuel cell stack 20 may be electrically connected to load 100 via an electrical connection 101 as depicted in FIG. 1. The fuel cell reactants and a cooling fluid (e.g., coolant 42) may be supplied by a fuel supply and other components of balance of plant 60, which may include compressors, pumps, valves, fans and sensors. A controller 90 uses feedback from sensors in balance of plant 60 and the fuel supply to control actuators in balance of plant 60 and the fuel supply 60.

A controller (e.g., controller 90) may be coupled to pumps for conveying the various fuels (e.g., fuel 40, conditioned fuel 43), oxidants (e.g., oxidant 41, conditioned oxidant 44, humidified oxidant 45) and coolants (e.g., coolant 42, exhaust coolant 48, coolant stream 49, conditioned coolant 50) to the various components of the fuel cell system (e.g., fuel cell system 10) described above. Various sensors may be located within fuel cell system 10 including balance of plant 60 and the various conduits connecting the components to allow the controller to control the flow of the various fuels and liquids throughout the fuel cell system. For example, a flow of fuel 40 and oxidant 41 may be controlled based on the electrical demand by load 100.

The controller described above, could be any type of computing unit having a processor and a memory (e.g., a personal computer operating a WINDOWS operating system or Apple OSX operating system, a Unix system, or a tablet computer or smart phone) and configured to communicate with and/or control a fuel cell (e.g., fuel cell 20), temperature sensors located on portions of the fuel cell including the plates thereof, an energy storage device (not shown), a balance of a plant (e.g., balance of plant 60), a fuel supply (e.g., a source of oxidants or fuel), a fan(s) (not shown), a blower(s) (not shown) and/or a load (not shown). Moreover, the controller could be a unit separate from the sensors fan, blower, fuel cell stack, energy storage device, and load device. Further, such a controller could be part of one or more of these components (e.g., the sensors, fan, blower, fuel cell, load device, and energy storage device) or could be distributed between these devices and other connected systems, such as the balance of plant while the distributed portions of such controller could be coupled to each other to allow communication therebetween. As indicated above, the controller (could be configured to communicate with the various components described in this paragraph such that an appropriate temperature of oxidant/cooling fluid arrives at an inlet of a fuel cell (e.g., fuel cell 20) to control flow of fluids in the fuel cell system and to condition a temperature of such fluids of the fuel cell.

The load described above could be any type of stationary or moveable load device, such as an industrial electrical vehicle or forklift truck. The fuel cell (e.g., fuel cell stack 20) could be any type of fuel cell such as a proton exchange membrane fuel cell, solid oxide fuel cell, or any other fuel cell as would be known by one of ordinary skill in the art. The energy storage device described above could be any type of battery or other way of storing energy such as a lithium ion battery, lead acid battery, air compression energy storage device, water storage device, capacitor, ultra-capacitor, or any other device for storing energy.

Figure 4:
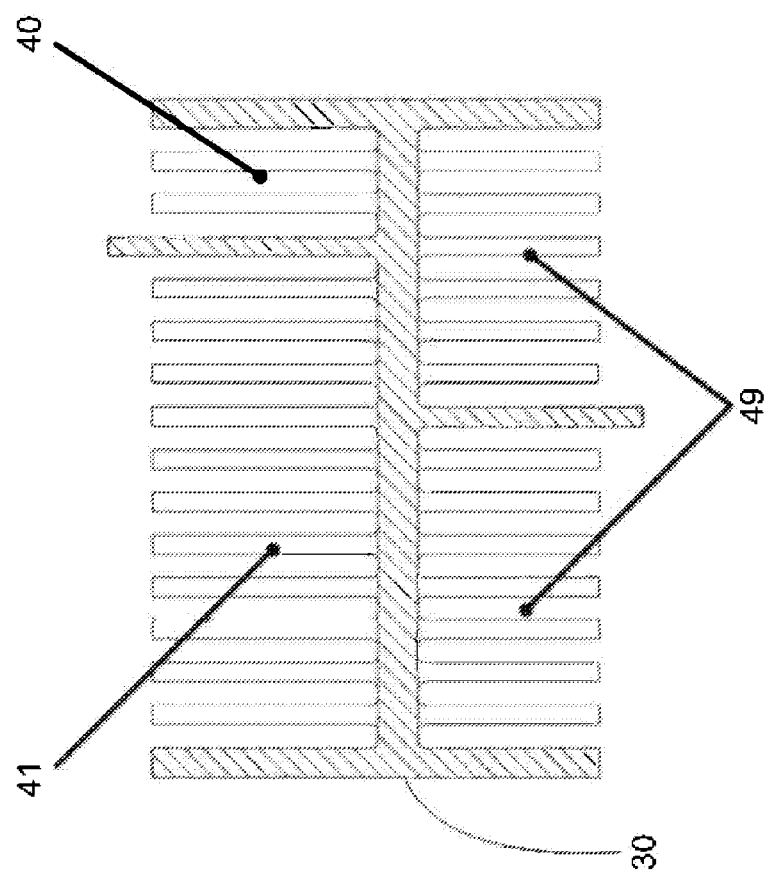
FIG. 4 is a side view of a reactant temperature conditioner of the fuel cell system of FIG. 1.
Figure 5:
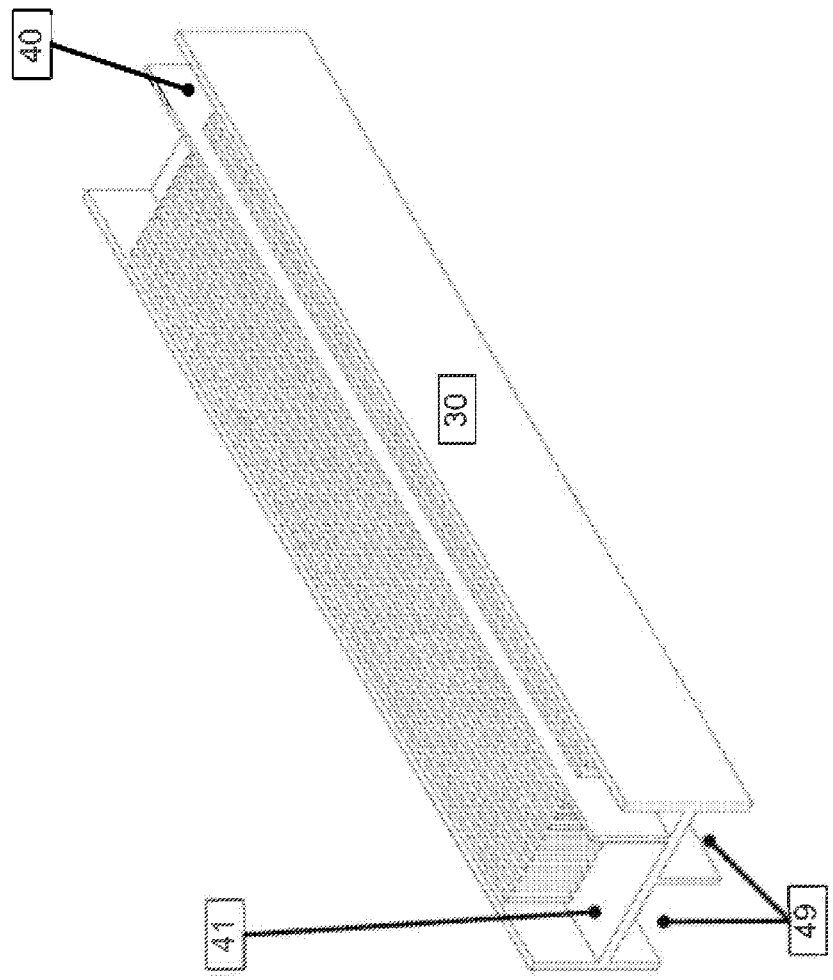
FIG. 5 is a perspective view of the reactant temperature conditioner of the fuel cell system of FIG. 1

The embodiment depicted in FIG. 4 and FIG. 5 is an example of an extrusion forming reactant conditioner heat exchanger 30. As depicted in these figures, fuel 40 and oxidant 41 may flow adjacent to one another in conditioner heat exchanger 30 and coolant stream 49 may flow on an opposite side of conditioner 30 such that more of coolant stream 49 is opposite oxidant 41 and less is opposite fuel 40.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

For the purposes of promoting an understanding of the principles of the invention, reference is made above to embodiments of the invention and specific language used to describe the same. It is nevertheless understood that no limitation of the scope of the invention is thereby intended, and any alterations and further modifications in the described embodiments, and any further applications of the principles of the invention as illustrated therein as would normally occur to one skilled in the art to which the invention relates are contemplated an protected.

What is claimed is:

1. A fuel cell system comprising:
   a fuel cell stack;
   a reactant temperature conditioner coupled to a fuel source and an oxidant source, said conditioner having a fuel inlet for receiving fuel from the fuel source and an oxidant inlet for receiving oxidant from the oxidant source, said conditioner configured to transfer heat energy from the oxidant to the fuel to arrive at a conditioned oxidant and a conditioned fuel;
   said conditioner having a fuel outlet coupled to said fuel cell stack to allow flow of the conditioned fuel to said fuel cell stack and an oxidant outlet to allow flow of the conditioned oxidant to said fuel cell stack.

2. The system of claim 1 wherein said conditioner comprises a heat exchanger to transfer the heat energy from the oxidant to the fuel to arrive at the conditioned oxidant and the conditioned fuel.

3. The system of claim 2 further comprising a coolant source coupled to said fuel cell stack, said fuel cell stack comprising a coolant outlet coupled to said conditioner to allow flow of exhaust coolant from said fuel cell stack to said conditioner to allow a transfer of heat energy to the fuel from the coolant.

4. The system of claim 1 further comprising an oxidant humidifier connected to said conditioner and said fuel cell stack to control a humidity of the conditioned oxidant prior to the conditioned oxidant flowing to said fuel cell stack.

5. The system of claim 4 further comprising a coolant source coupled to said fuel cell stack, said fuel cell stack comprising a coolant outlet coupled to said humidifier to allow flow of exhaust coolant from said fuel cell stack to said humidifier.

6. The system of claim 5 wherein said conditioner is coupled to said humidifier to allow flow of the exhaust coolant to said conditioner.

7. The system of claim 1 wherein said fuel cell stack is electrically coupled to a load device to provide electrical energy to said load device.

8. The system of claim 7 wherein said load device comprises an industrial electric vehicle.

9. The system of claim 1 wherein said fuel cell stack comprises a fuel inlet, a fuel outlet, an oxidant inlet and an oxidant outlet.

10. The system of claim 9 further comprising a mixer coupled to said fuel outlet to allow a fuel exhaust of said stack to flow to said mixer, and said mixer configured to mix the fuel exhaust with the fuel to result in a mixed fuel provided to said conditioner.

11. The system of claim 1 wherein said conditioner is coupled to said fuel outlet to allow a fuel exhaust of said stack to flow to said conditioner, the conditioner comprising a mixing portion to mix the fuel exhaust with the fuel prior to the conditioner transferring heat energy from the oxidant to the fuel to arrive at the conditioned oxidant and the conditioned fuel.

12. A fuel cell system comprising:
   a fuel cell stack;
   a reactant temperature conditioner coupled to a fuel source and an oxidant source, said conditioner having a fuel inlet for receiving fuel from the fuel source and an oxidant inlet for receiving oxidant from the oxidant source, said conditioner configured to transfer heat energy from the oxidant to the fuel to arrive at conditioned oxidant and conditioned fuel;
   said conditioner having a fuel outlet coupled to said fuel cell stack to allow flow of the conditioned fuel to said fuel cell stack and an oxidant outlet to allow flow of the conditioned oxidant to said fuel cell stack; and
   a coolant source coupled to said fuel cell stack, said fuel cell stack comprising a coolant outlet coupled to said conditioner to allow flow of exhaust coolant from said fuel cell stack to said conditioner to allow a transfer of heat energy from the oxidant to the coolant.

13. The system of claim 12 wherein said conditioner comprises at least one heat exchanger to transfer the heat energy from the oxidant to the coolant and to transfer the heat energy from the coolant to the fuel.

14. A method for operating a fuel cell comprising:
flowing a fuel from a fuel source and an oxidant from an oxidant source to a reactant temperature conditioner;
transferring heat energy from the oxidant to the fuel in the conditioner to form a conditioned oxidant and a conditioned fuel; and
flowing the conditioned oxidant and the conditioned fuel to a fuel cell stack.

15. The method of claim 14 further comprising flowing the conditioned oxidant to an oxidant humidifier and controlling the humidity of the conditioned oxidant prior to the conditioned oxidant flowing to the fuel cell stack.

16. The method of claim 15 further comprising flowing a coolant to the fuel cell stack and flowing a cooling exhaust from the fuel cell stack to the humidifier.

17. The method of claim 16 further comprising coupling the conditioner to the humidifier and flowing the exhaust coolant to the conditioner.

18. The method of claim 17 further comprising flowing a coolant exhaust from the fuel cell stack to the conditioner to transfer heat from the coolant to the fuel.

19. The method of claim 14 further comprising electrically coupling the fuel cell stack to a load device.

20. The method of claim 19 wherein the load device comprises an industrial electric vehicle.

21. The method of claim 14 further comprising flowing a fuel exhaust from the fuel cell stack to a mixer and mixing the fuel exhaust with the fuel from the fuel source to result in mixed fuel providing to the conditioner.

22. The method of claim 14 further comprising flowing a fuel exhaust from the fuel cell stack to the conditioner and mixing the fuel exhaust with the fuel from the fuel source in a mixing portion of the conditioner.

* * * * *